J. H. MOORE.
FLEXIBLE ELBOW.
APPLICATION FILED OCT. 2, 1913.

1,136,548.

Patented Apr. 20, 1915.
2 SHEETS—SHEET 1.

Witnesses

Inventor
J. H. Moore
By _____
Attorneys

J. H. MOORE.
FLEXIBLE ELBOW.
APPLICATION FILED OCT. 2, 1913.
1,136,548.
Patented Apr. 20, 1915.
2 SHEETS—SHEET 2.
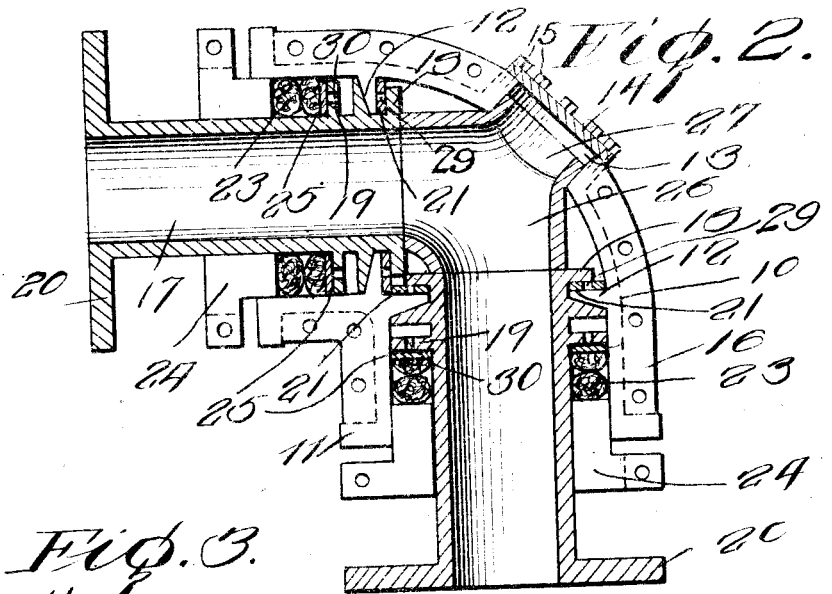
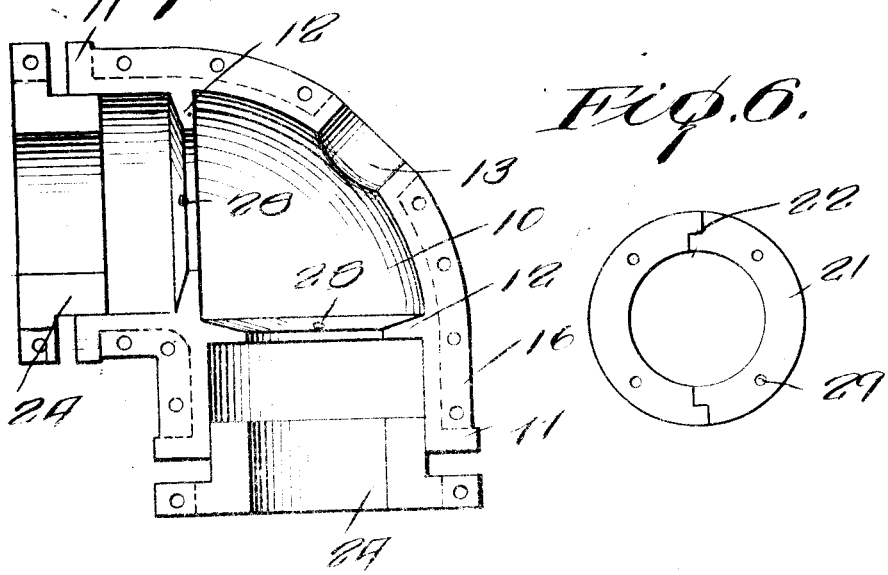
Inventor
J. H. Moore

UNITED STATES PATENT OFFICE.

JOSEPH H. MOORE, OF MULBERRY, FLORIDA.

FLEXIBLE ELBOW.

1,136,548.  Specification of Letters Patent.  Patented Apr. 20, 1915.

Application filed October 2, 1913. Serial No. 793,017.

*To all whom it may concern:*

Be it known that I, JOSEPH H. MOORE, a citizen of the United States, residing at Mulberry, in the county of Polk, State of Florida, have invented certain new and useful Improvements in Flexible Elbows; and I do hereby declare the following to be a full, clear, and exact description of the invention, such as will enable others skilled in the art to which it appertains to make and use the same.

This invention relates to pipe joints and has special reference to a pipe joint adapted to be used in connection with a pipe elbow, the joints being so arranged as to permit the swiveling of the elbow about either of the straight pipes.

The principal object of the invention is to improve the general construction of devices of this character.

A second object of the invention resides in the provision of a pipe joint of this character in which means formed integral with the elbow and swiveling members are employed whereby inward and outward movement of the latter under the influence of passage therethrough of fluid under pressure will be resisted.

A third object of the invention is to provide a joint of this character with a suitable liner.

With the above and other objects in view the invention consists in general of certain novel details of construction and combination of parts hereinafter fully described, illustrated in the accompanying drawings and specifically claimed.

Figure 1:
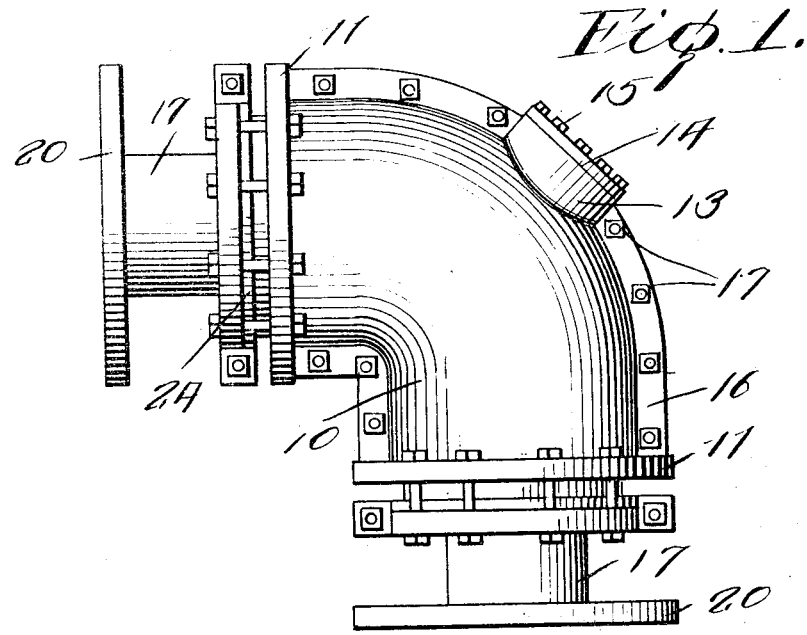
Figure 4:
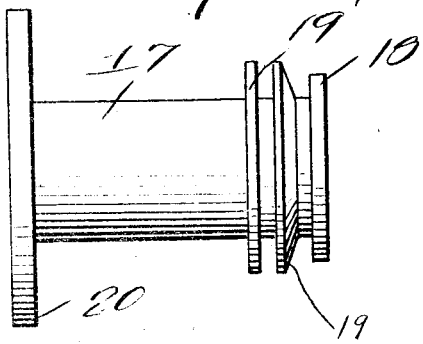
Figure 5:
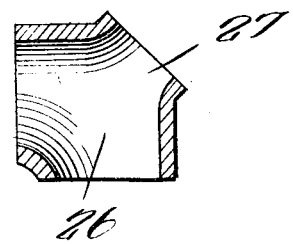

In the accompanying drawings, like characters of reference indicate like parts in the several views, and Figure 1 is a side elevation of a joint constructed in accordance with this invention. Fig. 2 is a section therethrough showing the parts in assembled position. Fig. 3 is a detail view of one-half of the joint casing or elbow. Fig. 4 is a detail side elevation of one of the revolving members, or pipe connections. Fig. 5 is a detail view of the liner used herewith. Fig. 6 is a detail side elevation of one of the split bearing rings.

In the present embodiment of the invention as illustrated in the drawings herewith the elbow consists of two similar halves indicated at 10. Each of these halves has at its extremity an external flange 11 and spaced from each extremity is an internal flange 12. This internal flange 12 is what is preferably termed the guide for the revolving pipe. At the center of the convex portion of each half is a semi-circular opening 13 which registers with a similar opening in the opposite half so that when the two halves are placed together the openings 13 form a hand hole which may be closed by a suitable hand hole plate 14, said plate being secured in position by suitable bolts 15 which engage in a flange around the hand hole. Each of the halves of this elbow is provided with a longitudinally extending flange 16 and these flanges are bolted together by suitable bolts 17' a suitable packing (not shown) being interposed between the two flanges for the purpose of rendering the joint water and air tight. Each of the swiveling members consists of a short cylindrical pipe portion 17 which has on its inner end a flange 18 and spaced from this flange 18 is a second flange 19. There is furthermore provided a third flange 19' which is spaced from the flange 19 to provide a lubricating space. The outer end of each of these sections is furthermore provided with a flange 20 for the purpose of attaching a straight pipe or making connection to any desired fluid conveying means. It will be obvious that in place of the flange connection 20 the ordinary screw connection may be used but it is not deemed necessary here to illustrate such a screw connection as the same is well known in the art and is commonly interchangeable with the flange connection.

The flanges 18 and 19 are arranged so that, when the device is assembled, they lie on opposite sides of the flanges 12 and between the flange 18 and the respective flanges 12 are interposed the brass washers or wearing plates indicated at 21 and each consisting of two similar halves connected by a Z joint 22. It is to be noted that by reason of this arrangement, when the sections 17 are inserted in place in the elbow, space will be left between the body of the sections and the wall of the elbow so that packings 23 may be placed in this space and held in position therein by means of suitable glands 24 of the ordinary type, it being noted that brass washers 25 are interposed between the inner end of the packings and the flanges 19'. This device furthermore is provided with a liner 26 which fits the central portion of the elbow and is of such shape and dimensions to form a continuation of the side walls of the pipe sections 17. This liner 26 is furthermore provided with an opening 27 in the concave portion of the liner so that access may be had to the interior of the joint through the hand hole 13. Extending through the flanges 12 are the oil holes 28 and the rings 21 are furthermore provided with oil holes 29 so that oil passing through the holes 28 can flow through these rings. The flange 19' of each of the pipe sections 17 is likewise provided with oil holes 30 so that the ring 25 adjacent said flange may be properly lubricated.

In assembling the device the one-half of the elbow proper is laid in convenient position and, the rings 21 having been placed on the joints 17, the joints are placed in position with these rings lying on opposite sides of the respective flanges 12. The rings 25 are then placed in posittion and slipped into the recess formed between the respective joints 17 and the body of the elbow. The other portion of the elbow is then placed on the first portion and the packing inserted and the two bolted firmly together by the bolt 17. The glands then being placed in position and the packing inserted the same is tightened up by the proper adjustment of the gland bolts.

It is to be noted that by means of this construction a joint capable of standing very heavy pressure is obtained since any tendency of the pipe joint 17 to move out of the elbow is resisted by the flange 18 of such a joint and furthermore in the case of suction pipe any tendency of the respective joint 17 to move inward is resisted by its flange 19. There has thus been provided a simple and efficient device of the kind described and of the character specified.

It is obvious that many minor changes may be made in the form and construction of this invention without departing from the material principles thereof. It is not therefore desired to confine the invention to the exact form herein shown and described, but it is wished to include all such as properly come within the scope claimed.

Having thus described the invention, what is claimed as new, is:—

A pipe connection comprising a body divided longitudinally into complementary sections, means for uniting said sections in assembled relation, internal flanges spaced from the respective ends of said sections and arranged to form continuous flanges when the sections are assembled, pipe sections each having spaced flanges at its inner end embracing the respective continuous flanges, said pipe sections being further provided each with a third flange spaced from the first mentioned flanges on said pipe sections, said pipe sections having body portions spaced from the body sections to form packing spaces, glands movable on the pipe sections to enter the packing spaces, and packing held between the third flange of each pipe section and its gland.

In testimony whereof, I affix my signature, in the presence of two witnesses.

JOSEPH H. MOORE.

Witnesses:
A. D. WEST,
L. N. PIPKIN.